(12) United States Patent
Voor et al.

(10) Patent No.: US 10,387,362 B2
(45) Date of Patent: Aug. 20, 2019

(54) SECONDARY DATA CHANNEL COMMUNICATION SYSTEM

(71) Applicant: Dell Products L.P., Round Rock, TX (US)

(72) Inventors: Thomas Edward Voor, Cedar Park, TX (US); Adolfo S. Montero, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/951,984

(22) Filed: Apr. 12, 2018

(65) Prior Publication Data
US 2018/0232335 A1 Aug. 16, 2018

Related U.S. Application Data

(63) Continuation of application No. 14/885,365, filed on Oct. 16, 2015, now Pat. No. 9,959,239.

(51) Int. Cl.
*G06F 8/656* (2018.01)
*G06F 11/30* (2006.01)
(Continued)

(52) U.S. Cl.
CPC .......... *G06F 13/4282* (2013.01); *G06F 8/656* (2018.02); *G06F 13/4022* (2013.01);
(Continued)

(58) Field of Classification Search
CPC .... G06F 8/656; G06F 11/3051; G06F 13/385; G06F 13/387; G06F 13/4022; G06F 13/4282; G06F 2213/0042
See application file for complete search history.

(56) References Cited

U.S. PATENT DOCUMENTS

2003/0222510 A1* 12/2003 Liao ............... H01R 31/065
                                                   307/147
2008/0167828 A1* 7/2008 Terlizzi ............ G06F 13/385
                                                      702/64
(Continued)

OTHER PUBLICATIONS

"VESA DisplayPort Alt Mode for USB Type-C Standard: Feature Summary," PowerPoint presentation, Sep. 22, 2014, VESA, , [retrieved Jun. 22, 2017];17 pages.*
(Continued)

*Primary Examiner* — Eric T Oberly
(74) *Attorney, Agent, or Firm* — Haynes and Boone, LLP

(57) ABSTRACT

A USB Type-C secondary data channel communication system includes a controller system coupled to a first USB Type-C connector. The controller system determines a second USB Type-C connector orientation when a second USB Type-C connector is connected to the first USB Type-C connector. The controller system then communicates with a connected system through a first data channel available through the second USB Type-C connector and determines that the connected system provides a second data channel mode. In response to determining the connected system provides the second data channel mode, the controller system uses the second USB Type-C connector orientation to configure the provisioning of first data through the first data channel and second data through a second data channel that is available through the second USB Type-C connector. Different data communications may then be provided to the connected system using the first and second data channels.

20 Claims, 9 Drawing Sheets

(51) Int. Cl.
    *G06F 13/38*     (2006.01)
    *G06F 13/40*     (2006.01)
    *G06F 13/42*     (2006.01)

(52) U.S. Cl.
    CPC ........ *G06F 11/3051* (2013.01); *G06F 13/385* (2013.01); *G06F 13/387* (2013.01); *G06F 2213/0042* (2013.01)

(56) References Cited

U.S. PATENT DOCUMENTS

| | | | | |
|---|---|---|---|---|
| 2016/0127671 A1* | 5/2016 | Hundal | ............... | G06F 13/4247 348/723 |
| 2016/0187420 A1* | 6/2016 | Trethewey | ....... | G01R 31/31705 714/727 |
| 2016/0253282 A1* | 9/2016 | Bowers | ............... | G06F 13/4022 710/316 |

OTHER PUBLICATIONS

"VESA DisplayPort Alt Mode for USB Type-C Standard: Feature Summary," PowerPoint Presentation, VESA, <http://www.vesa.org/wp-content/uploads/2014/09/DP-Alt-Mode-Overview-for-VESA-v1.pdf> Sep. 22, 2014, [Retreved Jun. 22, 2017], 17 Pages.

"USB Power Deliber Alternate Mode Control on Type-C," Cypress Semiconductor Corp., Data Sheet, <http://www.cypress.com/file/141251/download> Jul. 21, 2015 [Retrieved Jun. 22, 2017], 24 Pages.

* cited by examiner

| | | |
|---|---|---|
| A1 | GND | GND | B12 |
| A2 | TX1+ | RX1+ | B11 |
| A3 | TX1− | RX1− | B10 |
| A4 | VBUS | VBUS | B9 |
| A5 | CC1 | SBU2 | B8 |
| A6 | D+ | D− | B7 |
| A7 | D− | D+ | B6 |
| A8 | SBU1 | CC2 | B5 |
| A9 | VBUS | VBUS | B4 |
| A10 | RX2− | TX2− | B3 |
| A11 | RX2+ | TX2+ | B2 |
| A12 | GND | GND | B1 |

SECONDARY DATA CHANNEL COMMUNICATION SYSTEM

CROSS-REFERENCE TO RELATED APPLICATIONS

This is a Continuation application to U.S. Utility application Ser. No. 14/885,365 filed Oct. 16, 2015, entitled "SECONDARY DATA CHANNEL COMMUNICATION SYSTEM," the disclosure of which is incorporated herein by reference in its entirety.

BACKGROUND

The present disclosure relates generally to information handling systems, and more particularly to communicating data between information handling systems using a secondary data channel.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems require the ability to transfer large amounts of data between each other in order to operate properly. For example, docking systems connected to host computing systems may require large data transfers when flashing operations are performed for devices in the docking system. Flashing operations are typically performed to upgrade a device by overwriting existing firmware or data in the memory of that device, to change the provider of a service associated with a function of that device (e.g., changing a mobile phone service provider), to install a new operating system on that device, and/or to perform other flashing operations known in the art. However, docking systems such as, for example, docking systems implementing the Universal Serial Bus (USB) Type-C specification have proven to have relatively long latencies during flashing operations. This is due to the USB Type-C specification providing for control communications over a configuration channel (CC) line that connects to USB Type-C connectors, which was provided for flow-control operations and to establish end-point contracts, and is subject to a relatively high protocol overhead during data transmissions. As a result, flashing operations for a device in the docking system using the CC line are on the order of several minutes, which is undesirable and becomes even more so when flashing operations are performed for all the devices in the docking system.

Accordingly, it would be desirable to provide an improved system for transferring large amounts of data between systems that are currently limited by the issues described above.

SUMMARY

According to one embodiment, a secondary data channel communication system, comprising: a cable including a first cable connector and a second cable connector, wherein the cable provides a first data channel and a second data channel; a first system that is connected to the first cable connector; and a second system that is connected to the second cable connector, wherein the second system is configured to: determine, in response to connecting to the second cable connector, a second cable connector orientation of the second cable connector; communicate with the second system through the first data channel and, in response, determine that the second system provides a second data channel mode; configure, in response to determining the second system provides the second data channel mode and based on the second cable connector orientation, a plurality of multiplexers to provide first data through the first data channel and second data through the second data channel; and communicate first data over the first data channel to the second system, and second data over the second data channel to the second system.

BRIEF DESCRIPTION OF THE DRAWINGS

FIG. 3 is a schematic view illustrating an embodiment of a connector on the host system of FIG. 2.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
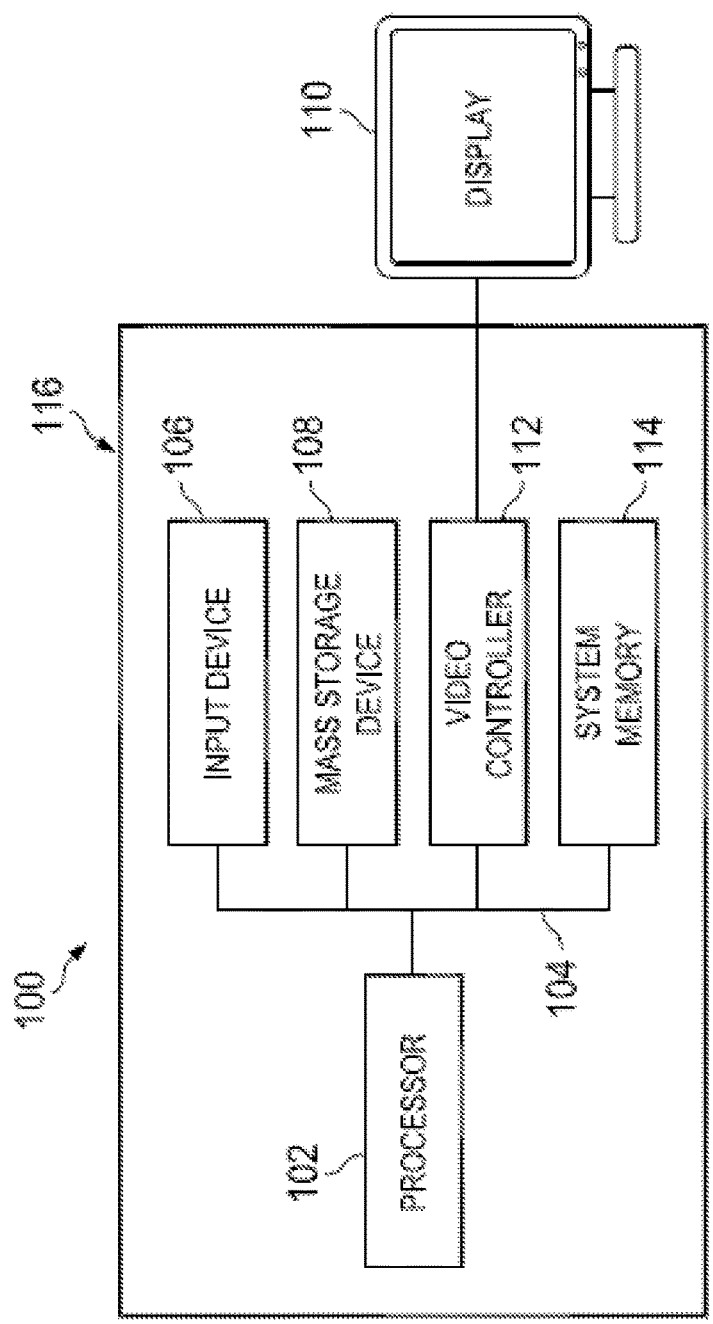
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
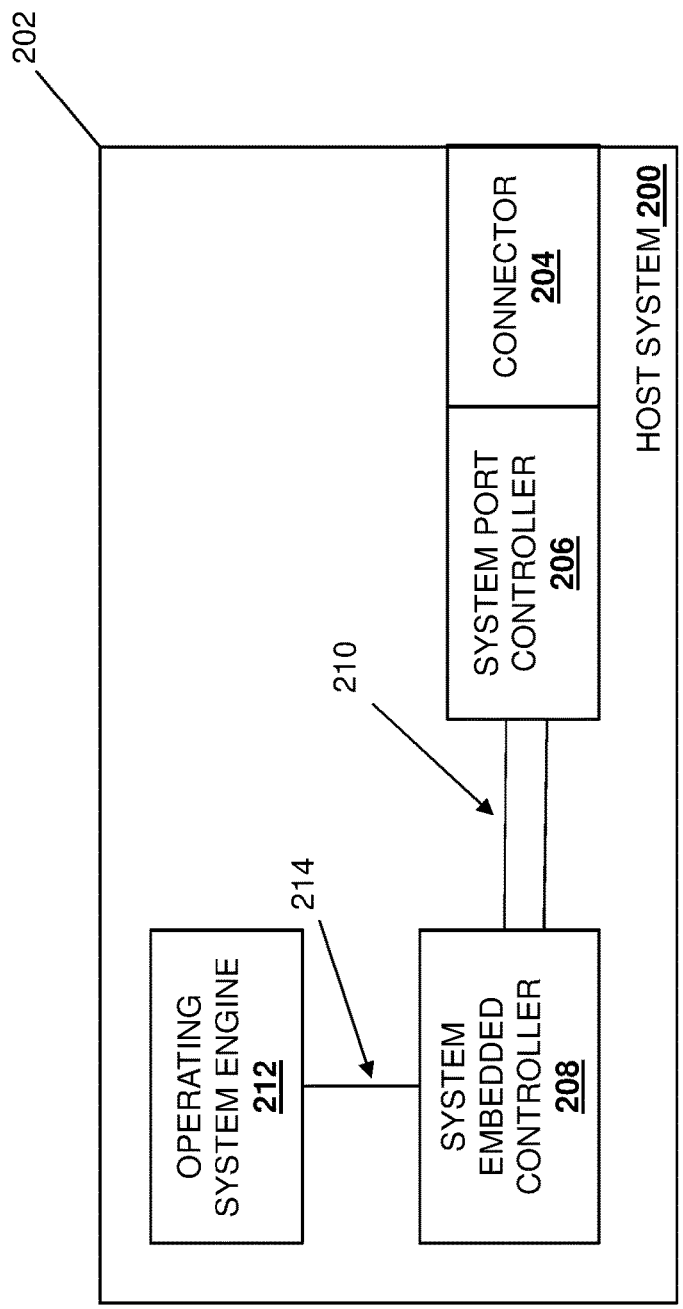
FIG. 2 is a schematic view illustrating an embodiment of a host system.

Referring now to FIG. 2, an embodiment of a host system 200 is illustrated. In an embodiment, the host system 200 may be the IHS 100 discussed above with reference to FIG. 1 and/or may include some or all of the components of the IHS 100. In the discussions below, the host system 200 is described as connecting to another system and, in response, operating to configure itself to transmit data over a secondary data channel, and one of skill in the art will recognize that any of a variety of systems may be provided as the host system while remaining within the scope of the present disclosure. The host system 200 includes a chassis 202 that houses the components of the host system 200, only some of which are illustrated in FIG. 2 for clarity. In the illustrated embodiment, the chassis 202 houses a connector 204 that may be accessible on an outer surface of the chassis 202, as illustrated. However, in some embodiments, the connector 204 may be housed entirely within the chassis 202 (and accessible within that chassis 202) while remaining within the scope of the present disclosure. As discussed in further detail below, in some embodiments, the connector 204 is a female Universal Serial Bus (USB) Type-C connector. However, other connectors may benefit from the teachings of the present disclosure and thus fall within its scope.

A system port controller 206 is housed in the chassis 202 and coupled to the connector 204. As discussed in further detail below, in some embodiments, the connector is a USB Type-C connector and the system port controller is a USB Type-C port controller. However, one of skill in the art in possession of the present disclosure will recognize how other port controllers may be used with other connectors while remaining within the scope of the present disclosure. A system embedded controller 208 is housed in the chassis 202 and coupled to the system port controller 206 through data lines 210. In an embodiment, the data lines 210 may include an Inter-Integrated Circuit ($I^2C$) clock and data (CLK/DAT) line and an $I^2C$ alert line, although other data lines will fall within the scope of the present disclosure. An operating system engine 212 is coupled to the system embedded controller 208 by a data line 214. In an embodiment, the data line 214 may include a Low Pin Count/ enhanced Serial Peripheral Interface (LPC/eSPI) line, although other data lines will fall within the scope of the present disclosure.

One or more processing systems (not illustrated, but which may include the processor 102 discussed above with reference to FIG. 1) may be housed in the chassis 202 and coupled to one or more memory systems (not illustrated, but which may be the system memory 114 discussed above with reference to FIG. 1) that are housed in the chassis 202 and that include instructions that, when executed by the processing system, cause the processing system to perform the functions of the controllers, engines, and host systems discussed below. For example, the system port controller 206 may be enabled by one or more processors executing instructions to perform the system port controller functionality discussed below, the system embedded controller may be enabled by one or more processors executing instructions to perform the system embedded controller functionality discussed below, and the operating system engine may be enabled by one or more processors executing instructions to perform the operating system engine functionality discussed below. In specific embodiments, the host system 200 may be provided by a notebook computing system, a tablet computing system, a mobile phone, other mobile computing systems, desktop computing systems, servers (where the server couples to server type of peripheral rather than the docking station discussed below), and/or a variety of other host systems known in the art.

Referring now to FIG. 3, an embodiment of a connector 300 that may be the connector 204 discussed above with reference to FIG. 2 is illustrated. One of skill in the art in possession of the present disclosure will recognize that the connector 300 of FIG. 3 illustrates pin locations on a USB Type-C connector that provides for a reversible plug connector for USB devices and USB cabling. As such, a male USB Type-C connector with the pin locations illustrated in FIG. 2 may inserted into a female USB Type-C connector with the pin locations illustrated in FIG. 2 in either of two male connector orientations while still allowing data transfer operations. However, systems using other types of connectors may benefit from the teachings of the present disclosure and thus will fall within its scope.

In the illustrated embodiment, the connector 300 includes a first row of pins having a ground return (GND) pin A1; a first SuperSpeed positive transmission (TX1+) pin A2; a first SuperSpeed negative transmission (TX1−) pin A3; a bus power (VBUS) pin A4; a first configuration channel (CC1) pin A5; a USB 2.0 positive position 1 (D+) pin A6; a USB 2.0 negative position 1 (D−) pin A7; a first Sideband Use (SB1) pin A8; a bus power (VBUS) pin A9, a second SuperSpeed negative receiver (RX2−) pin A10; a second SuperSpeed positive receiver (RX2+) pin A11; and a ground return (GND) pin A12. In the illustrated embodiment, the connector 300 also includes a second row of pins having a ground return (GND) pin B12; a second SuperSpeed positive receiver (RX1+) pin B11; a first SuperSpeed negative receiver (RX1−) pin B10; a bus power (VBUS) pin B9; a second Sideband Use (SB2) pin B8; a USB 2.0 negative position 2 (D−) pin B7; a USB 2.0 positive position 2 (D+) pin B6; a second configuration channel (CC2) pin B5; a bus power (VBUS) pin B4, a second SuperSpeed negative transmission (TX2−) pin B3; a second SuperSpeed positive transmission (TX2+) pin B2; and a ground return (GND) pin B1.

In some conventional host systems having female Type-C USB connectors (e.g., relatively inexpensive host systems) the D− pin A7 may be shorted to the D− pin B7 in order to allow male Type-C USB connectors to be connected in either of the male connector orientations while still allowing data transfer operations. This is done to allow relatively inexpensive USB Type-C cables/connectors that do not connect to the D− pin B7 to operate properly with the host system in either of the male connector orientations. However, one of skill in the art in possession of the present disclosure will recognize that such host system configurations leave a set of the USB 2.0 pins (e.g., the D+ pin AB and the D− pin A7, or the D+ pin B6 and the D− pin B7) unused when such USB Type-C cables/connectors are coupled to those host systems. As discussed below, the systems and methods of the present disclosure may operate to recognize when a conventionally unused set of USB 2.0 pins are available and, in response, reconfigure the host system (and/or USB Type-C cable/connector) to transmit data over a secondary data channel available through those USB 2.0 pins.

Figure 4:
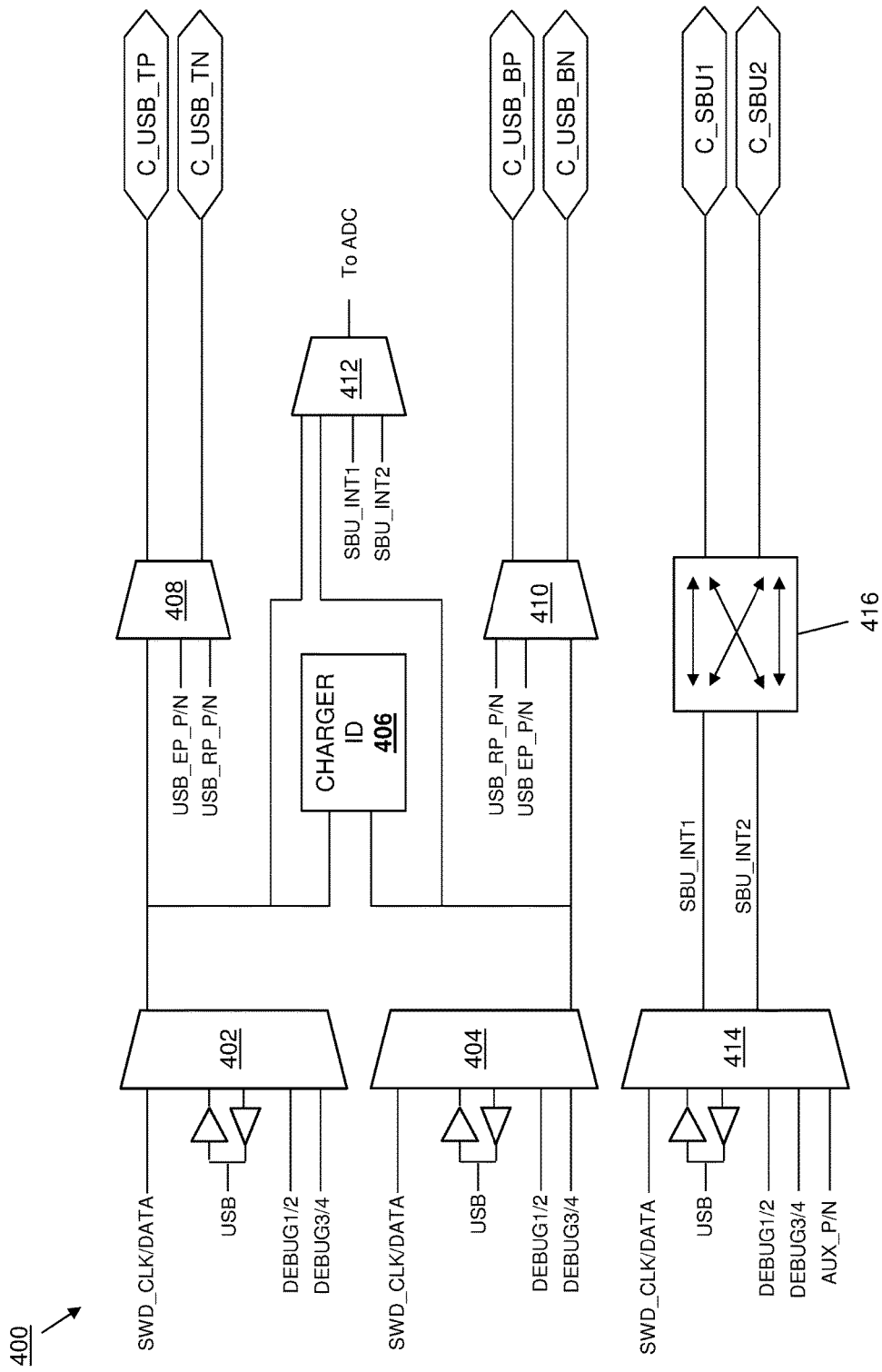
FIG. 4 is a schematic view illustrating an embodiment of a portion of a system port controller in the host system of FIG. 2.

Referring now to FIG. 4, an embodiment of a portion of a system port controller 400 is illustrated that may be included in the system port controller 206 discussed above with reference to FIG. 2 (as well as features on the connector 204 discussed above with reference to FIG. 2). One of skill in the art in possession of the present disclosure will recognize that the controller illustrated in FIG. 4 is derived from a real-world controller and shows many subsystems and functionality that is not relevant to the present disclosure and, as such, is not discussed in detail herein. In the illustrated embodiment, the system port controller 400 includes a plurality of multiplexers 402 and 404 that each receive Serial Wire Debug (SWD) clock and data (CLK/DATA) signals (e.g., via an SWD_CLK/DATA line), USB signals (e.g., via a USB line), DEBUG 1/2 signals (e.g., via a DEBUG 1/2 line), and DEBUG 3/4 signals (e.g., via a DEBUG 3/4 line). The multiplexer 402 is coupled to a charger identifier 406, a multiplexer 408, and a multiplexer 412, while the multiplexer 404 is coupled to the charger identifier 406, a multiplexer 410, and the multiplexer 412. The multiplexer 408 receives signals from the multiplexer 402, as well as USB_EP_P/N signals and USB_RP_P/N signals (e.g., via USB_EP_P/N and USB_RP_P/N lines), and outputs signals to a C_USB_TP pin (e.g., the D+ pin A6 discussed above with reference to FIG. 3) an a C_USB_TN (e.g., the D− pin A7 discussed above with reference to FIG. 3) on the connector 300. The multiplexer 410 receives signals from the multiplexer 404, as well as USB_EP_P/N signals and USB_RP_P/N signals (e.g., via USB_EP_P/N and USB_RP_P/N lines), and outputs signals to a C_USB-B_BP pin (e.g., the D+ pin B6 discussed above with reference to FIG. 3) an a C_USB_BN (e.g., the D− pin B7 discussed above with reference to FIG. 3) on the connector 300.

The multiplexer 412 receives signals from the multiplexer 402 and the multiplexer 404, as well as SBU_INT1 signals and SBU_INT2 signals (e.g., via SBU_INT1 and SBU_INT2 lines), and outputs signals to an analog-to-digital converter (ADC). The system port controller 400 also includes a multiplexer 414 that receives SWD_CLK/DATA signals (e.g., via an SWD_CLK/DATA line), USB signals (e.g., via a USB line), DEBUG 1/2 signals (e.g., via a DEBUG 1/2 line), DEBUG 3/4 signals (e.g., via a DEBUG 3/4 line), and AUX_P/N signals (e.g., via an AUX_P/N line). The multiplexer 414 outputs SBU_INT1 signals and SBU_INT2 signals (e.g., via SBU_INT1 and SBU_INT2 lines) to a crossbar switch 416, which provides those signals to a C_SBU1 pin (e.g., the SBU1 pin A8 discussed above with reference to FIG. 3) an a C_SBU2 pin (e.g., the SBU2 pin B8 discussed above with reference to FIG. 3) on the connector 300. One of skill in the art will recognize that the multiplexer 414, the crossbar switch 416, and the C_SBU1 and C_SBU2 pins operate to perform conventional USB Type-C functions known in the art.

Figure 5:
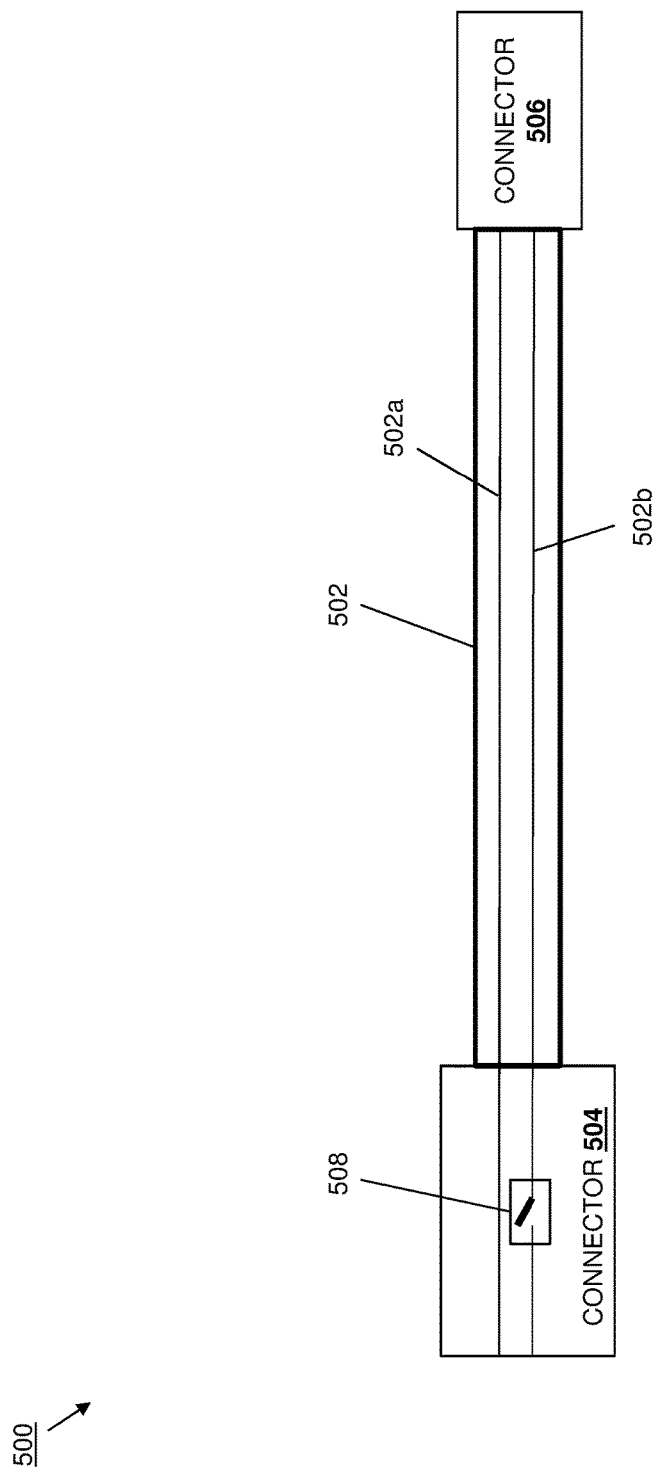
FIG. 5 is a schematic view illustrating an embodiment of a cable for connecting the host system of FIG. 2 to a connected system.

Referring now to FIG. 5, an embodiment of a cable 500 is illustrated. The cable 500 may include cabling 502 having any of a variety of cabling components such as wiring, insulators, sleeves, and/or other cabling components known in the art. In the illustrated embodiment, the cabling 502 includes a first data channel line 502a that, as discussed below, is configured to provide a first data channel, as well as one or more second data channel lines 502b that, as discussed below, are configured to provide a second data channel. In the embodiments discussed below, the first data channel line 502a is a USB Type-C configuration channel (CC) line that is configured to provide a USB Type-C configuration channel, and the second data channel line(s) 502b include a plurality of I$^2$C clock and data (I$^2$C_CLK/DATA) lines that are configured to provide an I$^2$C channel. However, other types of first data channels and second data channels may be provided by other data channel lines while remaining within the scope of the present disclosure. Furthermore, one of skill in the art in possession of the present disclosure will recognize that the cabling 502 may include a variety of other lines that may be utilized to transmit USB data, THUNDERBOLT® data, DisplayPort (or other video) data, and/or a variety of other data known in the art. While the lines in the cabling 502 are illustrated and described as provided in an insulated sleeve/jacket, in other embodiments those lines may be provided on a circuit board and/or in other line carriers known in the art.

The cable 500 includes a connector 504 that is coupled to an end of the cabling 502. In the embodiments discussed below, the connector 504 is a male USB Type-C connector and, as such, includes pins at pin locations that correspond those in the rows illustrated in FIG. 3. However, other types of connectors may benefit from the teachings of the present disclosure and thus will fall within its scope. The connector 504 couples the first data channel line 502a to pins such as, for example, CC pins that are configured to couple to the CC1 pin A5 and the CC2 pin B5 illustrated in FIG. 3. The connector 504 also couples the second data channel line(s) 502b to pins such as, for example, D+ pins and D− pins that are configured to couple to respective ones of the D+ pin A6 and the D− pin A7, and the D+ pin B6 and the D− pin B7, illustrated in FIG. 3. The cable also includes a connector 506 that is coupled to an end of the cabling 502 that is opposite the connector 504. In experimental embodiments, the connector 506 was provided by a 56-pin connector that was configured to transmit data received through the lines in the cabling 502 including USB data, I$^2$C data, THUNDER- BOLT® data, DisplayPort (or other video) data, and/or other data known in the art. However, other connectors may be utilized on the cable 500 while remaining within the scope of the present disclosure.

In the illustrated embodiment, a switch 508 is provided in the connector 504 and is configured to couple the second data channel line to the pins on the connector 504 discussed above. However, the switch 508 may be provided in the cabling 502 or the connector 506 while remaining within the scope of the present disclosure. The switch 508 is illustrated in an unactivated orientation such that the second data channel line 502b is not connected to the pins on the connector 504. As discussed above with reference to FIG. 3, in some conventional host systems, the D− pin A7 may be shorted to the D− pin B7 in order to allow male Type-C USB connectors to be connected in either of the male connector orientations while still allowing data transfer operations, and the unactivated orientation of the switch 508 may allow for the use of the cable 500 with such conventional host systems. However, as discussed below, the switch 508 may be activated into an activated orientation to provide for the secondary data channel communications using the systems and methods of the present disclosure.

Figure 6:
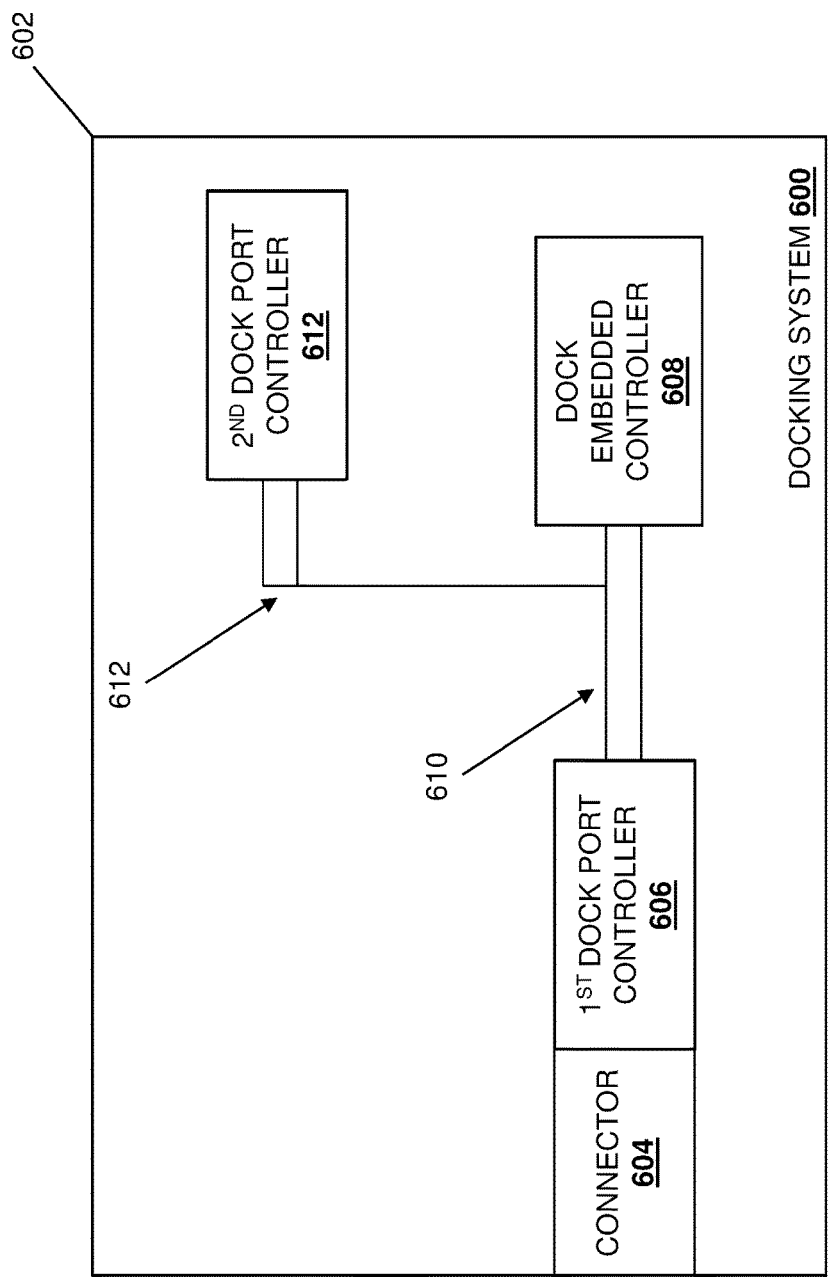
FIG. 6 is a schematic view illustrating an embodiment of a docking system that may be connected to the host system of FIG. 2 using the cable of FIG. 5.

Referring now to FIG. 6, an embodiment of a docking system 600 is illustrated. In an embodiment, the docking system 600 may be the IHS 100 discussed above with reference to FIG. 1 and/or may include some or all of the components of the IHS 100. In the discussions below, the docking system 600 is described as being connecting to the host system 200 of FIG. 2 and communicating with the host system 200 using a secondary data channel, and one of skill in the art will recognize that any of a variety of systems other than docking systems (e.g., external hard drives, peripheral devices, etc.) may be connected to the host system and communicate via the secondary data channel while remaining within the scope of the present disclosure. The docking system 600 includes a chassis 602 that houses the components of the docking system 600, only some of which are illustrated in FIG. 2 for clarity. In the illustrated embodiment, the chassis 602 houses a connector 604 that may be accessible on an outer surface of the chassis 602, as illustrated. However, in some embodiments, the connector 604 may be housed entirely within the chassis 602 (and be accessible within that chassis 602) while remaining within the scope of the present disclosure. In experimental embodiments, the connector 604 was provided by a 56-pin connector that was configured to transmit data including USB data, I²C data, THUNDERBOLT® data, DisplayPort (or other video) data, and/or other data known in the art. However, other connectors may be utilized on the docking system while remaining within the scope of the present disclosure.

A first dock port controller 606 is housed in the chassis 602 and coupled to the connector 604. As discussed in further detail below, in some embodiments, the first dock port controller 606 is a USB Type-C port controller. However, one of skill in the art in possession of the present disclosure will recognize how other port controllers may be used with other connectors while remaining within the scope of the present disclosure. A dock embedded controller 608 is housed in the chassis 602 and coupled to the first dock port controller 606 through data lines 610. In an embodiment, the data lines 610 may include an I²C CLK/DAT line and an I²C alert line, although other data lines will fall within the scope of the present disclosure. A second dock port controller 612 is housed in the chassis 602 and coupled to the first dock port controller 606 and the dock embedded controller 608 via data lines 612. As discussed in further detail below, in some embodiments, the second dock port controller 612 is a USB Type-C port controller. However, one of skill in the art in possession of the present disclosure will recognize how other port controllers may be used with other connectors while remaining within the scope of the present disclosure. In an embodiment, the data lines 612 may include an I²C bus providing an I²C CLK/DAT line and an I²C alert line to the second dock port controller 612, although other data lines will fall within the scope of the present disclosure. In the embodiments discussed below, the dock port controllers 606 and/or 612, and/or the dock embedded controller 608 are described as devices in the docking station 600 that are provided firmware updates over the secondary data channel. However, other devices may be provided in the docking station 600, and in some embodiments connected to the docking station 600 (e.g., via a connector coupled to the second dock port controller 612), and provided the firmware updates while remaining within the scope of the present disclosure. Furthermore, data transfers using the secondary data channel as discussed below may be provided to other systems and/or devices for reasons other than updating firmware while remaining within the scope of the present disclosure.

One or more processing systems (not illustrated, but which may include the processor 102 discussed above with reference to FIG. 1) may be housed in the chassis 602 and coupled to one or more memory systems (not illustrated, but which may be the system memory 114 discussed above with reference to FIG. 1) that are housed in the chassis 602 and that include instructions that, when executed by the processing system, cause the processing system to perform the functions of the controllers and docking systems discussed below. For example, the any or all of the first dock port controller 606, the second dock port controller 612, and/or the dock embedded controller 608 may be enabled by one or more processors executing instructions to perform the dock port controller and/or dock embedded controller functionality discussed below.

Figure 7:
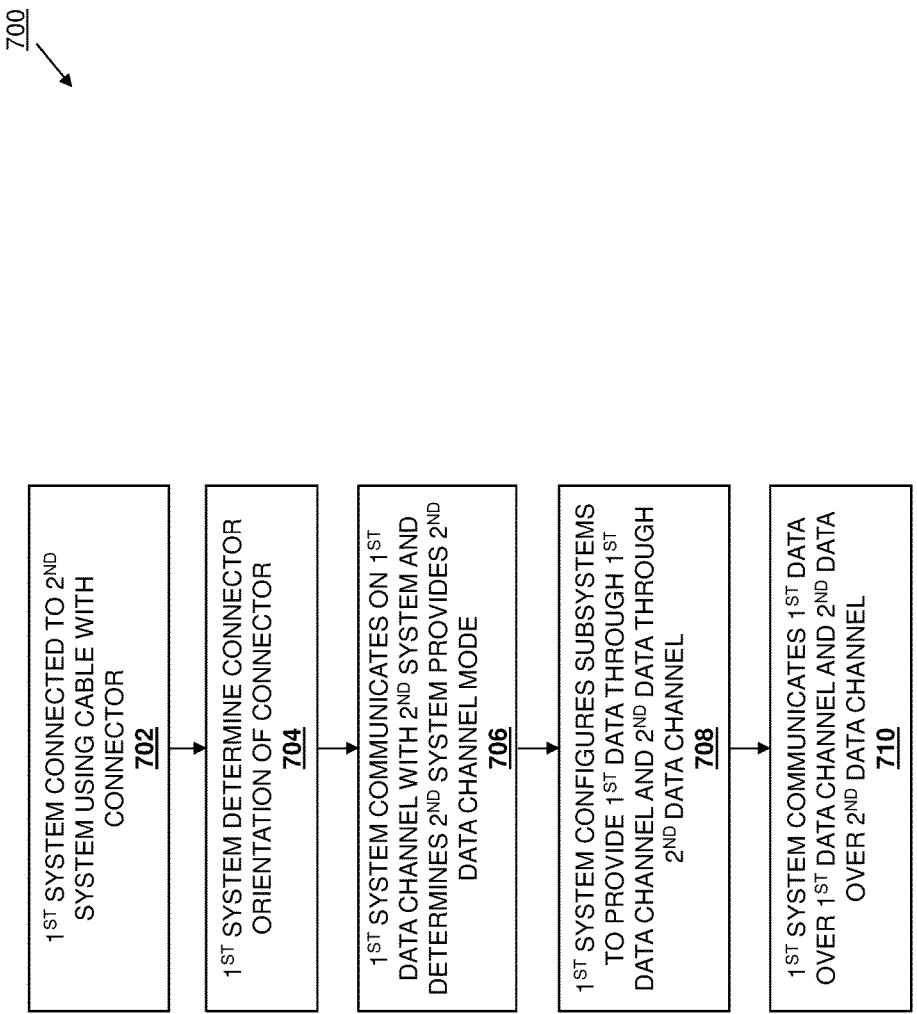
FIG. 7 is a flow chart illustrating an embodiment of a method for communicating using a secondary data channel.

Referring now to FIG. 7, an embodiment of a method 700 for communicating using a secondary data channel is illustrated. As discussed below, the systems of the present disclosure utilize the method 700 to repurpose conventionally unused signals and pins to enable one or more data channels to provide a secondary data channel that bypasses a first data channel and provides a dedicated sideband communication path that allows for the sending of relatively large amounts of data without the associated latencies of the first data channel. For example, when utilizing USB Type-C connectors and cabling, the D+ and D− pins in the female USB Type-C connector that are conventionally unused (i.e., the D+ pin B6 and the D− pin B7 when the male USB Type-C connector utilizes the D+ pin A6 and the D− pin A7 for USB 2.0 communications, or the D+ pin A6 and the D− pin A7 when the male USB Type-C connector utilizes the D+ pin B6 and the D− pin B7 for USB 2.0 communications) may be repurposed to provide access to an I²C channel that can then be used to bypass the configuration channel (e.g., accessed through the CC1 pin A5 or the CC2 pin B5). As discussed above, the configuration channel may be subject to data transmission "bottlenecks" due to the configuration channel protocol utilized in transmitting data, and thus the I²C channel provided by the systems and methods of the present disclosure may be dedicated for sideband communications that may then be used to send relatively large packets of data with relatively low protocol overhead (e.g., as compared to configuration channel protocol overheads) at 400 KHz I²C clock speeds. Such functionality may be enabled by the cabling of the present disclosure that assigns the signal directed to such data channels (e.g. by enabling I²C data lines) to the appropriate pins on its connectors and connected systems. However, while a specific embodiment using USB Type-C subsystems, configuration channels in those systems, and I²C channels is described, one of skill in the art in possession of the present disclosure will recognize that the teachings herein may be provided to other types of connectors providing access to other types of data channels while remaining within its scope.

Figure 8:
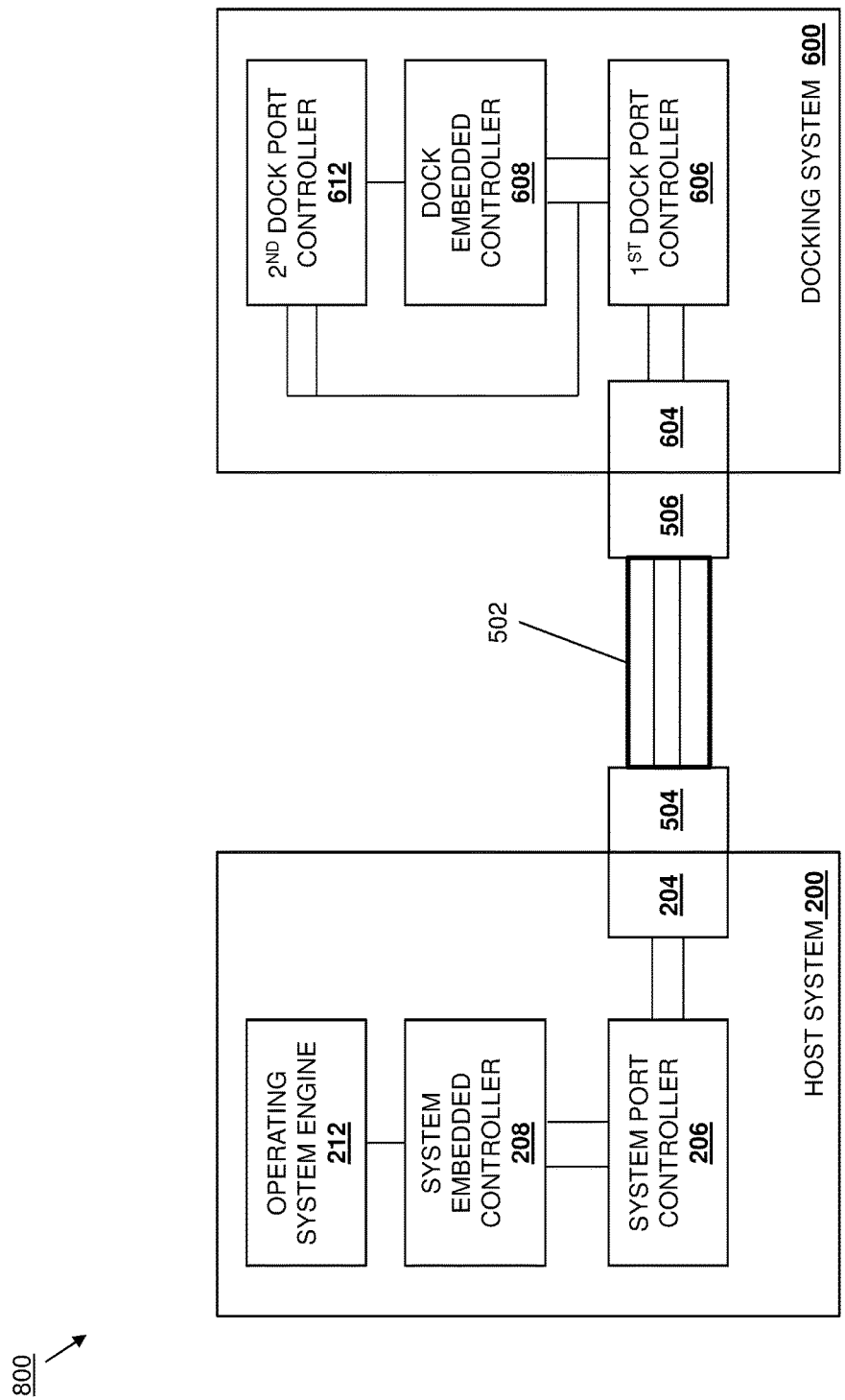
FIG. 8 is a schematic view illustrating an embodiment of the host system of FIG. 2 connected to the docking system of FIG. 6 using the cable of FIG. 5 during the method of FIG. 7.

The method 700 begins at block 702 where a first system is connected to a second system using a cable with a connector. Referring to FIG. 8, and with reference to FIGS. 2, 3, 4, 5, and 6, in an embodiment, the host system 200 may be provided as the first system, the docking system 600 may be provided as the second system, and the cable 500 may be provided as the cable. As such, at block 702 the connector 506 on the cable 500 may be connected to the connector 604 on the docking station 600. In some embodiments, the cable 500 may be a "captive cable" that is designed for the docking system 600 so that it may be optimized with regard to signal assignments to provide the functionality described herein. Furthermore, the connector 504 on the cable 500 may be connected to the connector 204 on the host system 200. As discussed above, the connector 504 may include a first row of pins and a second row of pins that correspond to the rows of pins on the connector 204 that have the pin locations illustrated in FIG. 3 (e.g., the rows A1-A12 and the row B1-B12). As such, the connector 504 may be connected to the connector 204 in a first orientation in which the first row of pins on the connector 504 engage a corresponding first row of pins on the connector 204 (e.g., the row of pins A1-A12) and the second row of pins on the connector 504 engage a corresponding second row of pins on the connector 204 (e.g., the row of pins B1-B12). Similarly, the connector 504 may be connected to the connector 204 in a second orientation that is opposite the first orientation in which the first row of pins on the connector 504 engage a corresponding second row of pins on the connector 204 (e.g., the row of pins B1-B12) and the second row of pins on the connector 504 engage a corresponding first row of pins on the connector 204 (e.g., the row of pins A1-A12). As discussed above, some conventional host systems may short the D− pin A7 to the D− pin B7, and thus at block 702 the switch 508 in the cable 500 is provided in an unactivated orientation in order to allow USB data transmission using the D+ pin A6 or the D+ pin B6 in such conventional systems.

The method 700 then proceeds to block 704 where the first system determines a connector orientation of the connector. In an embodiment, in response to the connector 504 being connected to the connector 204, the system embedded controller 208 and/or the system port controller 206 may determine the orientation of the connector 504. For example, at block 704, the connector 504 may be determined to have a first orientation in response to the first row of pins on the connector 504 being connected to the first row of the pins on the connector 204 (e.g., the row of pins A1-A12). In another example, at block 704, the connector 504 may be determined to have a second orientation that is opposite the first orientation in response to the first row of pins on the connector 504 being connected to a second row of the pins on the connector 204 (e.g., the row of pins B1-B12). As discussed below, this connector orientation of the connector 504 may be used in the method 700 to configure the host system 200 to transmit data over the secondary data channel. Furthermore, the first orientation of the connector 504 may include a pin in the first row of pins that is coupled to the first data channel line 502a/USB Type-C configuration channel line being connected to the CC1 pin A5 on the connector 204, and in response to determining the first connector 504 is in the first orientation, the CC2 pin B5 may be configured as a VCONN pin for cable or adapter power. Similarly, the second orientation of the connector 504 may include a pin in the first row of pins that is coupled to the first data channel line 502a/USB Type-C configuration channel line being connected to the CC2 pin B5 on the connector 204, and in response to determining the first connector 504 is in the second orientation, the CC1 pin A5 may be configured as a VCONN pin for cable or adapter power.

The method 700 then proceeds to block 706 where the first system communicates on a first data channel with the second system and determined that the second system provides a second data channel mode in which the second system supports the second data channel communications discussed below. In an embodiment, the system embedded controller 208 and/or the system port controller 206 in the host system 200 may use one of the CC1 pin A5 or the CC2 pin B5 (i.e., depending on the orientation of the connector 504) to access the first data channel line 502a and utilize the first data channel to communicate with the dock embedded controller 608 and/or the first dock port controller 606 in the docking system 200 and, in response, determine that the docking system 600 provides a second data channel mode. Similarly, the dock embedded controller 608 and/or the first dock port controller 606 in the docking system 600 may use the first data channel line 502a and one of the CC1 pin A5 or the CC2 pin B5 (i.e., depending on the orientation of the connector 504) to communicate with the system embedded controller 208 and/or the system port controller 206 in the host system 200 and, in response, determine that the host system 200 provides the second data channel mode. As discussed below, the second data channel mode may be any indication that the host system 200 and the docking system 600 are configured to communicate over the second data channel line 502b in the cable 500 as discussed below.

In an embodiment, at block 706, the communications over the first data channel between the host system 200 and the docking station 600 may include an exchange of identities. For example, either or both of the host system 200 and the docking station 600 may utilize USB power delivery communications on the configuration channel/first data channel 502a to identify themselves to the other, and those identities may be stored in a database accessible to the host system 200 and the docking station 600 that indicates system identities that are configured to operate in the secondary data channel mode. As such, the system embedded controller 208 and/or the system port controller 206 in the host system 200 may determine the identity of the docking system 600, access the database, and if that identity is included in the database, determine that the docking system 600 provides a secondary data channel mode (i.e., is configured to communicate over the second data channel line 502b as discussed below). Similarly, the dock embedded controller 608 and/or the first dock port controller 606 in the docking system 600 may determine the identity of the host system 200, access the database, and if that identity is included in the database, determine that the host system 200 provides a secondary data channel mode (i.e., is configured to communicate over the second data channel line 502b as discussed below). As discussed above, such communications over the configuration channel/first data channel 502a are subject to a relatively high protocol overhead.

The method 700 then proceeds to block 708 where the first system configures subsystems to provide first data through the first data channel and second data through the second data channel. In an embodiment, the system embedded controller 208 and/or the system port controller 206 in the host system 200 may use the connector orientation of the connector 504 to configure one or more subsystems in the host system 200 to route first data through the first data channel provided by the cable 500 and second data through the second data channel provided by the cable 500. For example, with reference to FIG. 4, at block 710 the multiplexers 402, 404, 408, and/or 410 may be configured by the system port controller 206 (e.g., in response to an instruction from the system embedded controller 208) to route the first data to the C_USB_TP pin (e.g., the D+ pin A6) and the C_USB_TN (e.g., the D– pin A7) on the connector 204, and route the second data to the C_USB_BP pin (e.g., the D+ pin B6) and the C_USB_BN (e.g., the D– pin B7) on the connector 204, when the connector 504 is in the first connector orientation. One of skill in the art in possession of the present disclosure will recognize that such a configuration of the multiplexer(s) will operate to route the first data through the first data channel line 502a in the cable 500, and route the second data through the second data channel lines 502b in the cable 500. In another example, with reference to FIG. 4, at block 710 the multiplexers 402, 404, 408, and/or 410 may be configured by the system port controller 206 (e.g., in response to an instruction from the system embedded controller 208) to route the first data to the C_USB_BP pin (e.g., the D+ pin B6) and the C_USB_BN (e.g., the D– pin B7) on the connector 204, and route the second data to the C_USB_TP pin (e.g., the D+ pin A6) and the C_USB_TN (e.g., the D– pin A7) on the connector 204, when the connector 504 is in the second connector orientation. One of skill in the art in possession of the present disclosure will recognize that such a configuration of the multiplexer(s) will operate to route the first data through the first data channel line 502a in the cable 500, and route the second data through the second data channel lines 502b in the cable 500.

In an embodiment, the first data may be USB data provided to the multiplexers 402 and 404 through the USB lines, and the second data may be I²C data provided to the multiplexers 402 and 404 through the DEBUG 1/2 lines. For example, I²C data from the I²C bus coupled to the system embedded controller 208 may be provided through some of the debug pins on the multiplexers 402 and 404. As such, the multiplexer 402 and the multiplexer 408 may be configured to provide the USB data to the C_USB_TP pin (e.g., the D+ pin A6) and the C_USB_TN (e.g., the D– pin A7) on the connector 204 when the connector 504 is in the first orientation, and provide the I²C data to the C_USB_TP pin (e.g., the D+ pin A6) and the C_USB_TN (e.g., the D– pin A7) on the connector 204 when the connector 504 is in the second orientation. Similarly, the multiplexer 404 and the multiplexer 410 may be configured to provide the I²C data to the C_USB_BP pin (e.g., the D+ pin B6) and the C_USB_BN (e.g., the D– pin B7) on the connector 204 when the connector 504 is in the first orientation, and provide the USB data to the C_USB_BP pin (e.g., the D+ pin B6) and the C_USB_BN (e.g., the D– pin B7) on the connector 204 when the connector 504 is in the second orientation. The configuration of the multiplexers in discussed above may be provided between the dock embedded controller 608 and the first dock port controller 606 as well.

Figure 9:
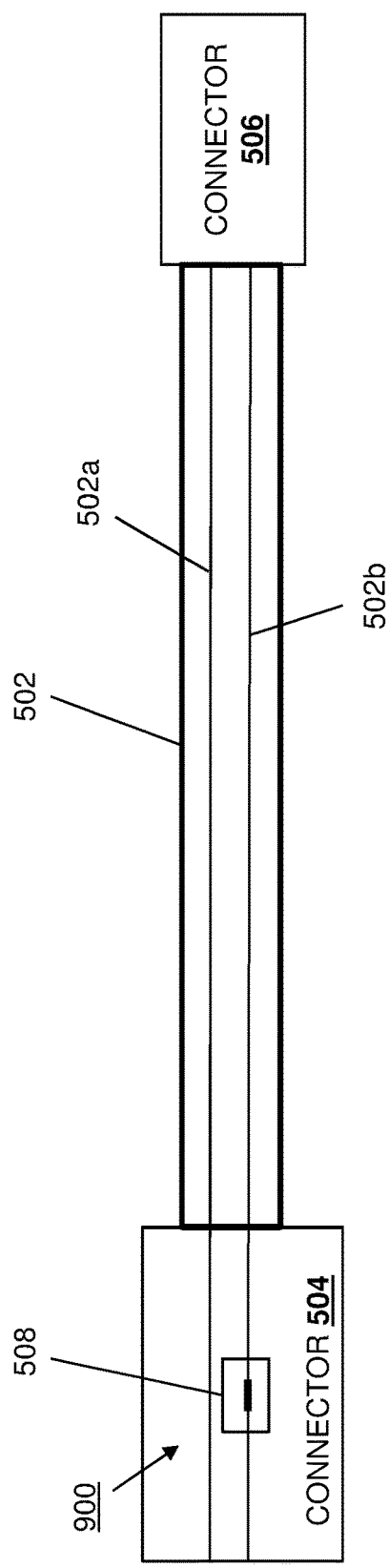
FIG. 9 is a schematic view illustrating an embodiment of the cable of FIG. 5 during the method of FIG. 7.

While the subsystem configuration at block 708 is discussed with regard to the multiplexers illustrated in FIG. 4, in another embodiment of block 710, a switch in the cable may activated to enable the second data channel. With reference to FIG. 9, the host system 200 and/or the docking system 600 may provide an instruction that activates the switch 508 in the cable 500 into an activated orientation 900 that closes the switch 508 from the unactivated orientation illustrated in FIG. 5 in order to enable the second data channel via the second data channel line 502b. For example, in response to determining that the docking system 600 provides the second data channel mode, the system embedded controller 208 and/or the system port controller 206 in the host system 200 may provide an instruction that activates the switch 508 into the activated orientation 900. In another example, in response to determining that the docking system 600 provides the second data channel mode, the dock embedded controller 608 and/or the first dock port controller 606 in the docking system 600 may provide an instruction that activates the switch 508 into the activated position 900. As would be understood by one of skill in the art in possession of the present disclosure, the unactivated orientation of the switch 508 allows the cable 500 to be used with conventional systems that short the D– A7 pin to the D– B7 pin in the connector 204 as discussed above, while the activated orientation of the switch 508 couples the second data channel lines 502a to pins in the second row of pins on the connector 504 that are connected to either the D+ pin A6 and the D– pin A7, or the D+ pin B6 and the D– pin B7 (i.e., depending on the orientation of the connector 504).

The method 700 then proceeds to block 710 where the first system communicates first data over the first data channel and second data over the second data channel. In an embodiment, following the configuration of the subsystems at block 710, the system embedded controller 208 and/or the system port controller 206 in the host system 200 may operate to transmit (send and/or receive) the first data over the first data channel provided by the cable 500 with the docking system 600, and transmit (send and/or receive) the second data over the second data channel provided by the cable 500 with the docking system 600. For example, the first data may include control data and/or other communications that may provide for flow control operations, the establishment of end-point contracts, and/or other control and/or configuration functionality known in the art, and that first data may be transmitted by the system embedded controller 208 and through the CC1 pin A5 or the CC2 pin B5 (depending on the orientation of the connector 504) and over the first data channel line 502a to the dock embedded controller 608 in the docking station 600. Such control data and/or other communications may be used by the docking system 600 in a conventional manner.

In another example, the second data may include a relatively large data communication such as, for example, a firmware update that may be provided for a device included in or coupled to the docking system 600 (e.g., the dock embedded controller 608, the dock port controllers 606 and/or 612, etc.), and that second data may be received by the system embedded controller 208 from the operating system engine 212 and transmitted through the D+ pin A6 and the D– pin A7, or the D+ pin B6 and the D– pin B7 (whichever pair is being unused for USB 2.0 data depending on the orientation of the connector 504) and over the second data channel lines 502b to dock embedded controller 608 in the docking station 600. Such relatively large data communications may be used by the docking system 600 to, for example, update firmware on one or more devices included in or coupled to the docking station 600. In experimental embodiments in which the second data channel was provided by I²C lines accessed through the D+ pin A6 and the D– pin A7 or the D+ pin B6 and the D– pin B7 and used for flashing operations to update firmware on the dock port controllers or dock embedded controller in the docking station 600, such data communications over the I²C lines were completed four and half times faster relative to the performance of same flashing operations using the first data channel provided by the configuration channel accessed through the CC1 pin A5 or the CC2 pin B5.

While the secondary data channel has been described above as being utilized to transmit firmware updates to devices in the system that is connected to the host system, one of skill in the art will recognize that the secondary data channel may be utilized for a variety of data communications known in the art. In some embodiments, any embedded-controller-to-embedded-controller transactions (e.g., between the system embedded controller 208 and the dock embedded controller 608) may be performed over the secondary data channel enabled by the systems and methods of the present disclosure. For example, if the first data channel fails or is experiencing latencies, the secondary data channel may be utilized as a recovery path and/or to avoid such latencies. In another example, the secondary data channel may be used to simplify embedded-controller-to-embedded-controller communications by removing all code that communicates over the primary data channel and providing for communication over the secondary data channel (e.g., via a dedicated hardware configuration supported by the cable of the present disclosure). In another embodiment, the secondary data channel may be utilized as an authentication and/or security path. For example, an I²C channel may utilize a different data protocol than the configuration channel such that data transmitted on the I²C channel is not subject to decoding using configuration channel protocol analyzers. While the use of the D+ pin A6 and the D− pin A7 or the D+ pin B6 and the D− pin B7 has been described due to the hardware support already present in system port controllers that couples those pins to the system embedded controller, the teachings of the present disclosure may be modified to use the high speed pins (e.g., the TX1+ pin A2, the TX1− pin A3, the RX2− pin A10, the RX2+ pin A11, TX1+ pin B2, the TX1− pin B3, the RX2− pin B10, the RX2+ pin B11) instead when additional hardware support is provided to couple those pins to the system embedded controller.

Thus, systems and methods have been described that repurpose conventionally unused signals and pins to access data channel lines that provide a secondary data channel that bypasses a first data channel and provides a dedicated sideband communication path that allows for the sending of relatively large amounts of data without the protocol overhead and complexity associated with the first data channel. For example, subsets of USB 2.0 pins on USB Type-C connectors that are conventionally unused in particular connector orientations may instead be coupled to an I²C channel enabled in a cable that bypasses a configuration channel to provide a dedicated sideband communication path for providing firmware updates to a connected system, thus avoiding the data transmission "bottlenecks" that result from the configuration channel protocol utilized in transmitting data over the configuration channel.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A secondary data channel communication system, comprising:
a cable including a first data channel and a second data channel;
a first system that is connected to the cable; and
a second system that is connected to the cable and that includes a configurable data communication subsystem, wherein the second system is configured to:
determine that the cable is connected to the second system in a cable connector orientation;
communicate with the first system through the first data channel and, in response, determine that the first system is configured to operate in a second data channel mode that provides for the transmission of first data through the first data channel separately from second data that is transmitted through the second data channel;
reconfigure, in response to determining the first system is configured to operate in the second data channel mode and based on the cable connector orientation, the configurable data communication subsystem from operating in a first data channel mode that provides for the transmission of both the first data and the second data through the first data channel, to operating in the second data channel mode;
communicate, to the first system, the first data over the first data channel; and
communicate, to the first system, the second data over the second data channel separately from the first type data that is communicated over the first data channel.

2. The secondary data channel communication system of claim 1, wherein the cable includes a switch coupled to the second data channel, and wherein the second data channel is enabled by activating the switch in response to determining that the first system is configured to operate in the second data channel mode.

3. The secondary data channel communication system of claim 1, wherein the configurable data communication subsystem includes a plurality of configurable multiplexers.

4. The secondary data channel communication system of claim 1, wherein the cable includes a Universal Serial Bus (USB) Type-C connector that connects the cable to the second system in the cable connector orientation, and the first data channel is provided by a configuration channel.

5. The secondary data channel communication system of claim 1, wherein the second data channel is provided by Inter-Integrated Circuit (I²C) channel.

6. The secondary data channel communication system of claim 1, wherein the first data includes control data and the second data includes firmware update data for at least one device in the first system.

7. An Information Handling System (IHS), comprising:
a cable connector;
a configurable data communication subsystem;
a processing system coupled to the cable connector and the configurable data communication subsystem; and
a memory system coupled to the processing system and including instructions that, when executed by the processing system, cause the processing system to provide at least one controller that is configured to:
determine that a cable is connected to the cable connector in a cable connector orientation;
communicate through a first data channel in the cable and, in response, determine that a connected system is configured to operate in a second data channel mode that provides for the transmission of first data through the first data channel separately from second data that is transmitted through a second data channel in the cable;

reconfigure, in response to determining the connected system is configured to operate in the second data channel mode and based on the cable connector orientation, the configurable data communication subsystem from operating in a first data channel mode that provides for the transmission of both the first data and the second data through the first data channel, to operating in the second data channel mode;

communicate, to the connected system, the first data over the first data channel; and communicate, to the connected system, the second data over the second data channel separately from the first data that is communicated over the first data channel.

8. The IHS of claim 7, wherein the cable includes a switch coupled to the second data channel, and wherein the second data channel is enabled by activating the switch in response to determining that the connected system is configured to operate in the second data channel mode.

9. The IHS of claim 7, wherein the configurable data communication subsystem includes a plurality of configurable multiplexers.

10. The IHS of claim 7, wherein the cable connector includes a Universal Serial Bus (USB) Type-C connector, and the first data channel in the cable is provided by a configuration channel.

11. The IHS of claim 7, wherein the second data channel in the cable is provided by Inter-Integrated Circuit ($I^2C$) channel.

12. The IHS of claim 7, wherein the first data includes control data and the second data includes firmware update data for at least one device in the first system.

13. The IHS of claim 7, wherein the at least one controller includes an embedded controller and a USB Type-C port controller.

14. A method for communicating using a secondary data channel, comprising:

determining, by a first system, that a cable is connected to the first system in a cable connector orientation;

communicating, by the first system, through a first data channel in the cable and, in response, determining that a second system is configured to operate in a second data channel mode that provides for the transmission of first data through the first data channel separately from second data that is transmitted through a second data channel in the cable;

reconfiguring, by the first system in response to determining the second system is configured to operate in the second data channel mode and based on the cable connector orientation, a configurable data communication subsystem in the first system from operating in a first data channel mode that provides for the transmission of both the first data and the second data through the first data channel, to operating in the second data channel mode;

communicating, by the first system to the second system, the first data over the first data channel; and communicating, by the first system to the second system, the second data over the second data channel separately from the first data that is communicated over the first data channel.

15. The method of claim 14, wherein the cable includes a switch coupled to the second data channel, and wherein the second data channel is enabled by activating the switch in response to determining that the second system is configured to operate in the second data channel mode.

16. The method of claim 14, wherein the configurable data communication subsystem includes a plurality of configurable multiplexers.

17. The method of claim 14, wherein the cable includes a Universal Serial Bus (USB) Type-C connector that is connected to the first system in the cable connector orientation, and wherein the first data channel in the cable is provided by a configuration channel.

18. The method of claim 14, wherein the second data channel in the cable is provided by Inter-Integrated Circuit ($I^2C$) channel.

19. The method of claim 14, wherein the first data includes control data and the second data includes firmware update data for at least one device in the first system.

20. The method of claim 14, wherein the configuring the configurable data communication subsystem in the first system to enable operation in the second data channel mode includes multiplexing data from an embedded controller bus in the first system to debug pins in a port controller in the first system.

* * * * *